(12) United States Patent
Doleh et al.

(10) Patent No.: US 8,219,802 B2
(45) Date of Patent: Jul. 10, 2012

(54) SYSTEM, METHOD AND PROGRAM PRODUCT FOR CONSOLIDATED AUTHENTICATION

(75) Inventors: Yaser K. Doleh, North Royalton, OH (US); Christopher G. Kalamaras, Watertown, CT (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 12/116,616

(22) Filed: May 7, 2008

(65) Prior Publication Data

US 2009/0282239 A1 Nov. 12, 2009

(51) Int. Cl.
*G06F 21/00* (2006.01)
(52) U.S. Cl. ........ 713/155; 713/151; 713/168; 713/171; 726/7; 726/8
(58) Field of Classification Search ....... 726/8; 713/155
See application file for complete search history.

(56) References Cited

U.S. PATENT DOCUMENTS

| | | | |
|---|---|---|---|
| 6,892,307 B1 | 5/2005 | Wood et al. | |
| 2002/0112155 A1 | 8/2002 | Martherus et al. | |
| 2002/0156905 A1 | 10/2002 | Weissman | |
| 2003/0105981 A1 | 6/2003 | Miller et al. | |
| 2004/0250118 A1 | 12/2004 | Andreev et al. | |
| 2006/0048216 A1 | 3/2006 | Hinton et al. | |
| 2006/0236109 A1* | 10/2006 | Krischer et al. | 713/171 |
| 2009/0307490 A1* | 12/2009 | Dancer | 713/168 |
| 2010/0242102 A1* | 9/2010 | Cross et al. | 726/7 |

OTHER PUBLICATIONS

Cing-hang,"Security Scheme for a Mobile Agent Based Network", Sep. 2010, Springer, pp. 230-256.*

Matsunaga et al.,"Secure Authentication System for Public WLAN Roaming", Proceedings of the 1st ACM International Workshop on Wireless Mobile Applications and Services on WLAN Hotspots WMASH '03, Sep. 19, 2003, pp. 113-121.
Fleury et al., "Single Sign-On for Java Web Start Applications Using Myproxy", Proceedings of the 3rd ACM Workshop on Secure Web Services, Nov. 3, 2006, pp. 95-101.
Samar, Vipin, "Single Sign-On Using Cookies for Web Applications", Enabling Technologies: Infrastructure for Collaborative Enterprises, Jun. 1999, 6 pgs.
"Maintaining Session State with Session Cookies", http://publib.boulder.ibm.com/infocenter/tivihelp/v2r1/index.jsp?topic=/com.ibm.itame2.doc_5.1/am51_webservers_guide79.htm.
"Tivoli Access Manager for E-Business", http://www-306.ibm.com/software/tivoli/products/access-mgr-e-bus/.

* cited by examiner

*Primary Examiner* — Taghi Arani
*Assistant Examiner* — Gregory Lane
(74) *Attorney, Agent, or Firm* — Arthur J. Samodovitz

(57) ABSTRACT

A first computer sends a request to the second computer to access the application. In response, the second computer determines that the user has not yet been authenticated to the application. In response, the second computer redirects the request to a third computer. In response, the third computer determines that the user has been authenticated to the third computer. In response, the third computer authenticates the user to the application. In response, the second computer returns a session key to the third computer for a session between the application and the user. The session has a scope of the second computer or the application but not a scope of a domain. In response to the authentication of the user to the second application and receipt by the third computer of the session key from the second computer for a session between the user and the second computer or the application, the third computer generates another session key with a scope of the domain and sends the domain-scope session key to the first computer. The first computer sends another request to the application with the domain-scope session key.

6 Claims, 3 Drawing Sheets

SYSTEM, METHOD AND PROGRAM PRODUCT FOR CONSOLIDATED AUTHENTICATION

FIELD OF THE INVENTION

The invention relates generally to user authentication for computer programs, and more specifically to consolidated authentication of a user at a client computer to one or more applications in one or more application servers.

BACKGROUND OF THE INVENTION

It is common for applications that are sensitive or applications that manage sensitive data to require user authentication before granting user access to the application or its data. Authentication prevents unauthorized or unknown users from gaining the benefit of the application, attacking the application or attacking or exploiting the data managed by the application. Authentication typically requires a valid password for a userID.

It was known for a web application that authenticates a user to generate a "session cookie", record the session cookie and send the session cookie to the web browser of the user's computer where it is stored. The session cookie contains an identifier of the session and the application for which the session is effective. The web browser sends the session cookie with subsequent requests to the web application to notify the web application that the user has already been authenticated to the web application in the same session. If the session cookie is sent with a request to the same application that established the session, the application will recognize the session and not again request authentication information from the user. The web browser may also send the session cookie with subsequent requests to different web applications. However, this other web application will not have any record of the session and therefore, will request authentication information from the user to establish a current session with this other web application. If the web browser does not include any session cookie with the request, then this other web application will request authentication information from the user to establish a current session with this other web application. A session cookie expires at the end of the session, and the application that established the session and session cookie will delete or invalidate the identifier for the session.

Some corporations have multiple internal and external websites with web servers running different applications. It was known to require a user, at the start of a session, to separately supply his or her userID and password for each application within the corporation that he or she wants to access. In such a scenario, each application can maintain a list of valid combinations of userID and password or can access such a list from a central directory and compare the list of valid combinations to the combination presented by the requester. In this scenario, the user does not have to authenticate himself or herself for access to every application.

A known single sign-on technique uses a proxy server such as IBM Tivoli Access Manager™ proxy or Computer Associates eTrust SiteMinder™ proxy. The proxy server is interposed between a user computer and all related applications resident on one or more web servers of the same corporation. Upon request by the proxy server, each user supplies authentication information to the proxy server once per session with the proxy server. The same authentication information—userID and password, is valid for all user requests for all related applications during the same user session with the proxy server. The proxy server then manages authentication to the related applications. Users make all requests via the proxy server to access and use the related applications. Thus, when the user requests access to any of the related applications during the same session with the proxy server, the proxy server furnishes the user's authentication information (userID and password) to such application. The proxy server also relays all subsequent requests by the user to the application during the same session with the proxy server. While the foregoing single sign-on technique reduces the authentication burden on the user, it requires a proxy server interposed between all users' workstations and all application server. The proxy server must handle a large volume of user requests and application responses. The proxy server may be "transparent" (sometimes called a "reverse" proxy server), in which case the user and client computer need not be aware of the proxy server. In the case of a transparent proxy server, the client computer addresses the requests to the web application server. However, a domain name server substitutes the address of the proxy server for the user requests so the user requests go directly to the proxy server instead of the web application server. If the proxy server is "visible" (sometimes called a "forward" proxy server), the client computer "knows" of the proxy server and is reconfigured to address web application requests directly to the proxy server instead of the web application server.

Tivoli Federated Identity Manager™ software allows for disparate domains to share identity information from one or many identity providers. Such identity federation strategies require integration into an existing single sign-on domain such as Tivoli Access Manager™, a trust establishment between the service and identity providers, and additional hardware and software components integrated into the existing application hosting environment. In this scenario, the client request flow would be the same as the Tivoli Access Manager™ solution described above, except for the manner in which the proxy authenticates the client's identity and authorizes access to the content in the request. In the above scenario, the proxy authenticates users and gains authorization to a resource for a particular request all within the scope of the local Tivoli Access Manager™ domain. In a Federated Identity Manager architecture, the proxy component of the Tivoli Access Manager™ domain in which the application resides would communicate with a centralized identity provider either in that same domain, or in another Tivoli Access Manager™ domain. This allows disparate Tivoli Access Manager™ domains to act as application service providers, while all authenticating against a centralized identity provider.

U.S. Published Application serial 2003/0105981 by Miller et al. discloses sharing of session information among related applications. According to this technique, when a user initially authenticates himself or herself to one application, the one (authenticating) application sends the authentication information and session information to related applications (in the same or different web server), before the user attempts to access the related applications. The one (authenticating) application also sends a session cookie to the user's web browser. The session cookie includes the session identifier and an identification of an application that can validate the session. If the user attempts to access one of the other, related application, the web browser supplies the session cookie, and the other, related application verifies the session cookie with the one (authenticating) application. If the session is valid, then the other, related application will grant the user access to itself without requesting authentication information from the user. While the sharing of session information is effective for single sign-on, the one authenticating application sends authentication information to related applications for which the user may never access.

An object of the present invention is to provide an effective, single sign-on technique for related applications.

Another object of the present invention is to provide an effective single sign-on technique which can be applied to existing applications without making any modifications to these applications.

Another object of the present invention is to provide an effective, single sign-on technique for related applications without requiring a proxy server of the foregoing types.

SUMMARY OF THE INVENTION

The present invention resides in a computer system, method and program product for authentication of a user at a first computer to an application at a second computer. The first computer sends a request to the second computer to access the application. In response, the second computer determines that the user has not yet been authenticated to the application. In response, the second computer redirects the request to a third computer. In response, the third computer determines that the user has been authenticated to the third computer. In response, the third computer authenticates the user to the application. In response, the second computer returns a session key to the third computer for a session between the application and the user. The session has a scope of the second computer or the application but not a scope of a domain. In response to the authentication of the user to the second application and receipt by the third computer of the session key from the second computer for a session between the user and the second computer or the application, the third computer generates another session key with a scope of the domain and sends the domain-scope session key to the first computer. The first computer sends another request to the application with the domain-scope session key. In response, the application recognizes a valid session between the user and the application based on the domain-scope session key and responds to the first computer in compliance with the other request. The domain is a group of applications including the application in the second computer, or a group of computers including the second computer, which are owned or operated by a same entity or have a same domain name URL component.

DETAILED DESCRIPTION OF THE PREFERRED EMBODIMENTS

Figure 1:
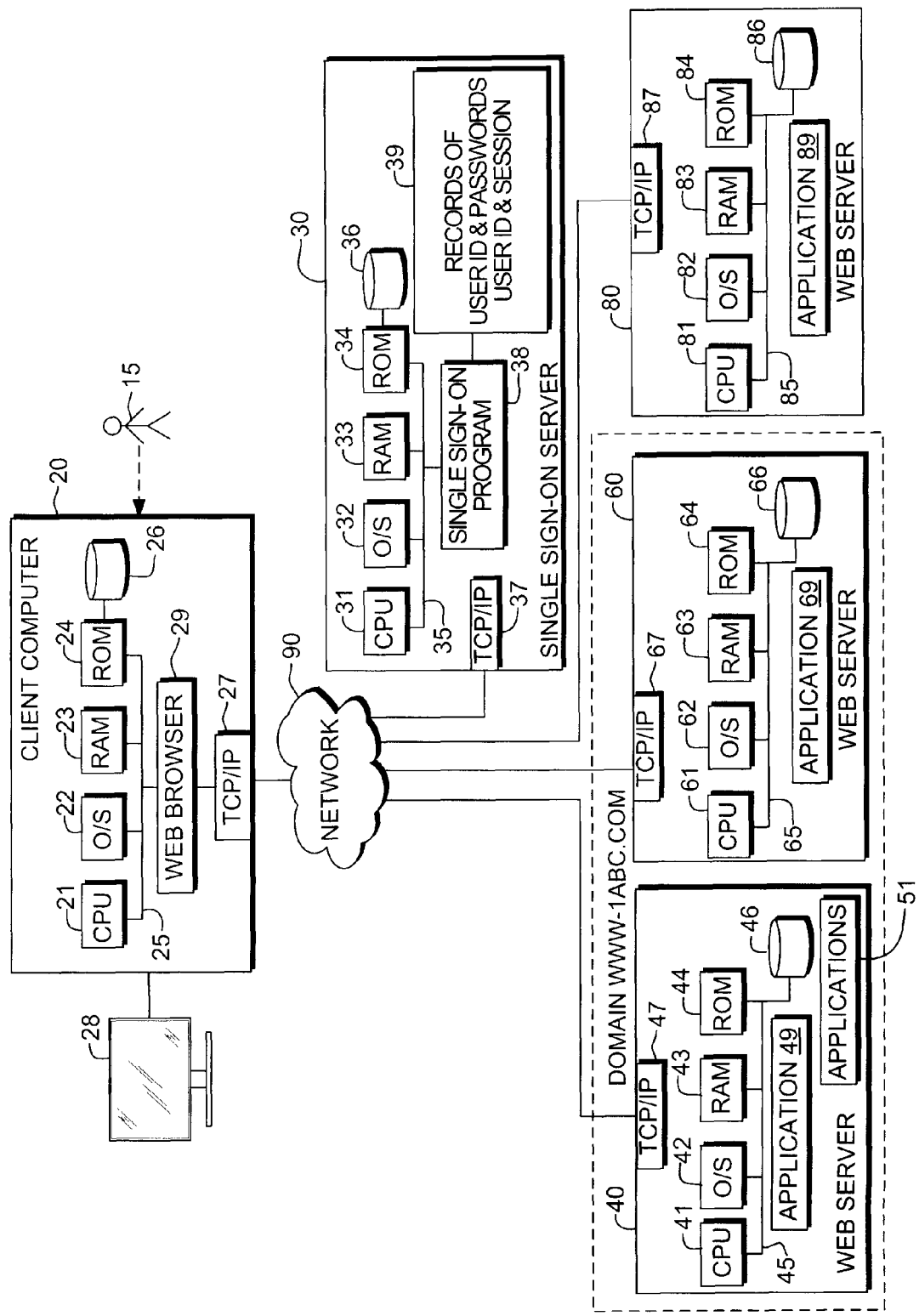
FIG. 1 is a block diagram of a distributed computer system which includes a single sign-on program within a user's computer according to the present invention.
Figure 2A:
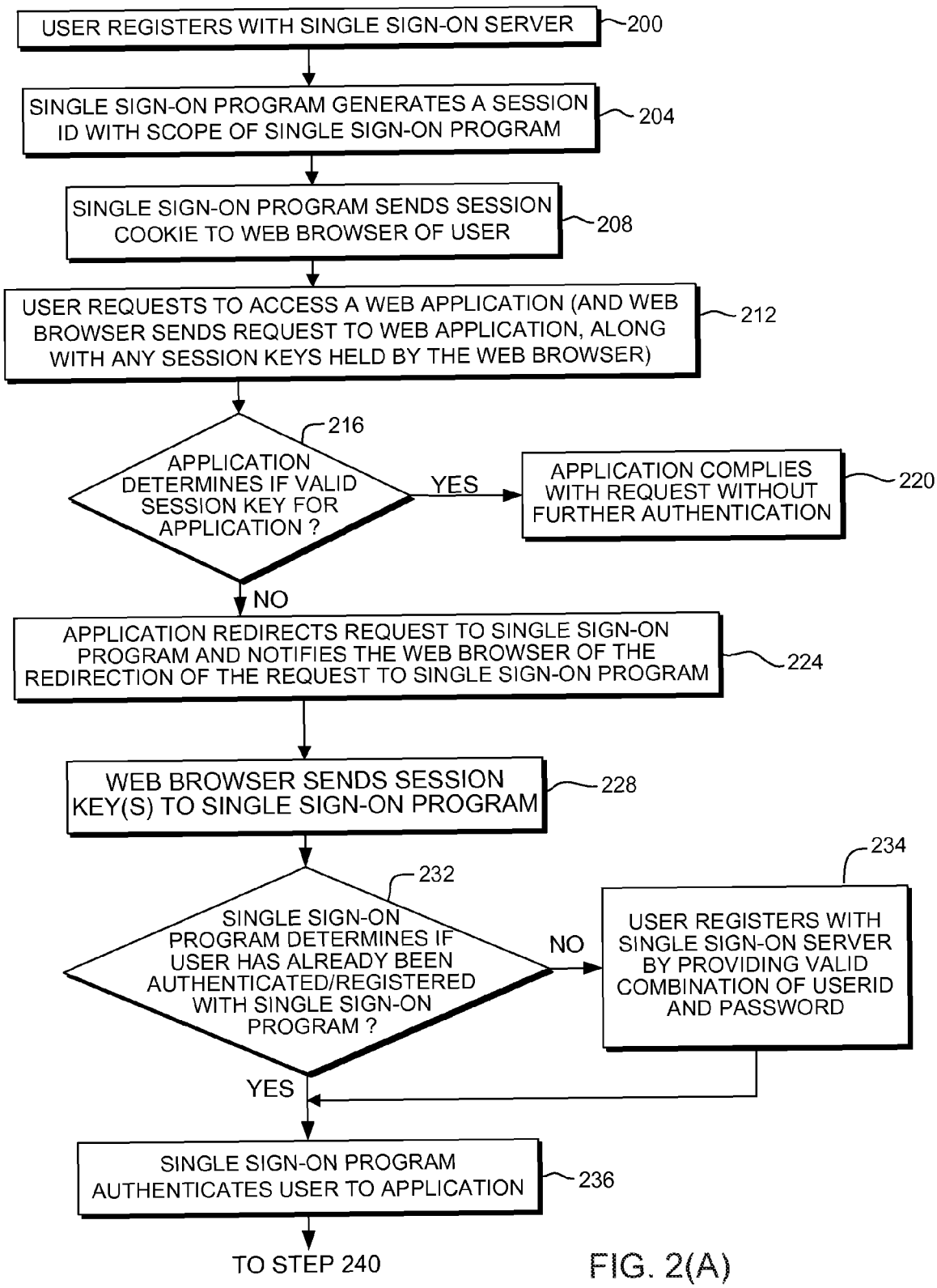
FIGS. 2(A) and 2(B) form a flow chart of the single sign-on program of FIG. 1.
Figure 2B:
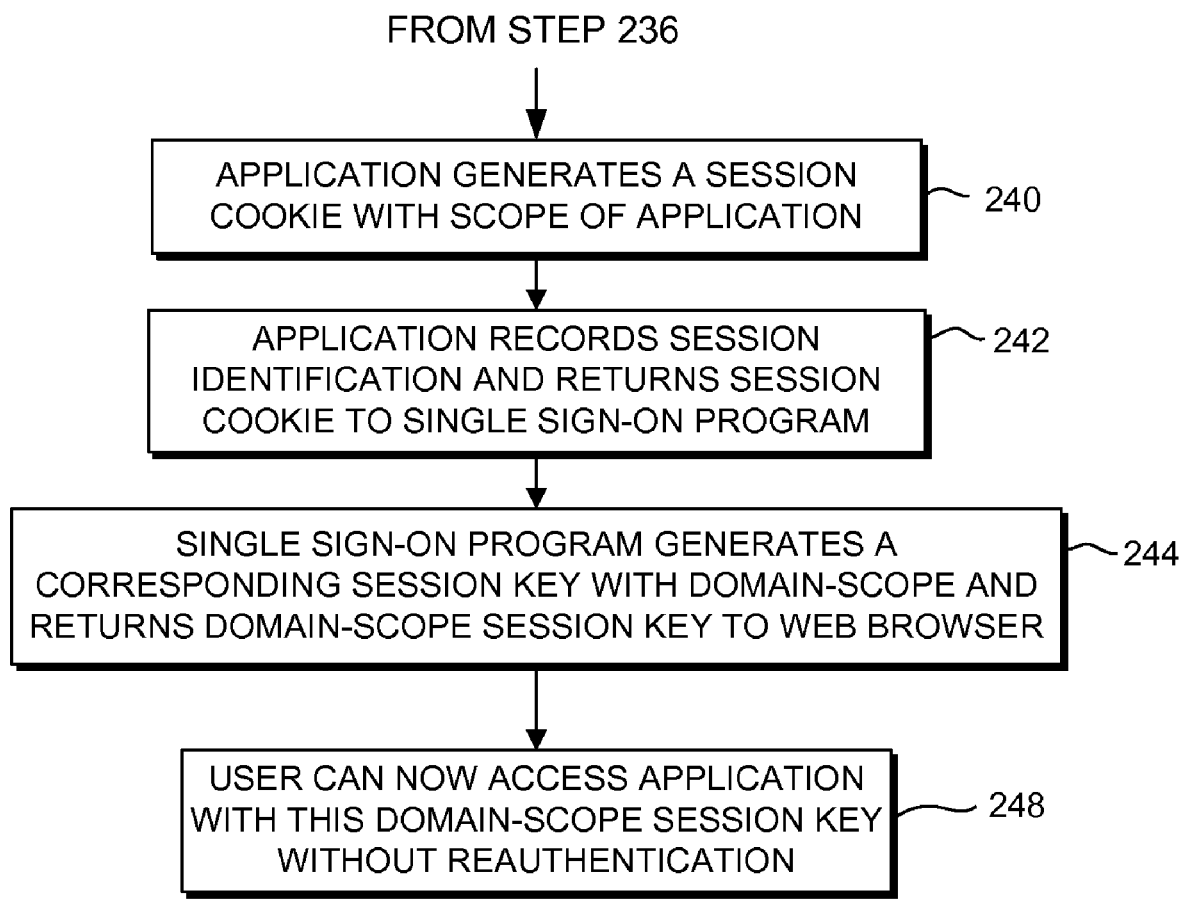

The present invention will now be described in detail with reference to the figures. FIG. 1 illustrates a distributed computer system generally designated 10 according to the present invention. System 10 includes a single sign-on server 30 and multiple web application servers 40, 60 and 80 all interconnected to a client computer 20 via a network 90 such as the Internet. In a typical scenario, a user 15 of client computer 20 attempts to access applications 49, 69 and 89 (such as web applications) on web application servers 40, 60 and 80, respectively, and such applications require user authentication prior to access.

Client computer 20 includes a known CPU 21, operating system 22, RAM 23 and ROM 24 on a common bus 25 and storage 26, TCP/IP adapter card 27 and monitor 28. Client computer 20 also includes a known web browser 29.

Web server 40 includes a known CPU 41, operating system 42, RAM 43 and ROM 44 on a common bus 45 and storage 46 and TCP/IP adapter card 47.

Web server 60 includes a known CPU 61, operating system 62, RAM 63 and ROM 64 on a common bus 65 and storage 66 and TCP/IP adapter card 67.

Web server 80 includes a known CPU 81, operating system 82, RAM 83 and ROM 84 on a common bus 85 and storage 86 and TCP/IP adapter card 87.

Single sign-on server 30 includes a known CPU 31, operating system 32, RAM 33 and ROM 34 on a common bus 35 and storage 36 and TCP/IP adapter card 37. Single sign-on server 30 also includes a single sign-on (login) program 38 according to the present invention. (Alternately, the single sign-on server program 38 can be installed in one of the web application servers 40, 60 or 80 instead of a separate server 30.) A user 15 registers with single sign-on program 38, i.e. provides a valid combination of userID and password (step 200), before obtaining single-sign on access to any of the web applications 49, 69 or 89. This can occur before the user makes an attempt to access any web application or as part of the process of accessing a web application for the first time, as explained below. In response to this registration, single sign-on program 38 generates a session ID and session cookie representing the session between user 15 and single sign-on program 38 (without domain-scope) (step 204). Single sign-on program 38 also sends the corresponding session cookie (without domain-scope) to web browser 29 to be set in web browser 29 for a session with single sign-on program 38 (step 208). As explained in more detail below, this session cookie will participate in the single sign-on authentication process when the user 15 attempts to access any of the web applications 49 69 or 89.

During one mode of operation, a user 15 invokes web browser 29 and makes a request to access a named application on a web application server, such as a request to access application 49 on web application server 40 (step 212). The web browser 29 forwards the request to the web application 49 in web application server 40, in the known manner via Internet 90. (For example, web browser 29 or a gateway server, not shown, for client computer 20 can query a domain name server, not shown, for the IP address of web application 49 based on the URL of the web application and then send the request with the URL to the IP address of the web application 29.) If web browser 29 has an active session cookie for this user (for a session with the requested application 49 or any other application), then web browser 29 will include the session cookie for application 49 with the access request sent to the web application server 40. Such a session cookie contains an identifier of the currently active session in which the user 15 is a participant and the scope of effectiveness of the session. For example, the scope of the session is the URL of the web application that originally established the session with the user 15 and defined the application session cookie. If the session cookie is valid for web application 49 (decision 216, yes branch), then web application 49 complies with the request without requesting further authentication from the user or web browser 29 (step 220). However, if web browser 29 does not have an application session cookie to send with the user access request or the application session cookie provided with the user access request does not identify an active session of the user with the requested web application 49 (decision 216, no branch), then the requested web application 49 redirects the user access request including the session cookie to the single sign-on program 38 on server 30 (step 224). Application 49 also sends a "redirect" message to web browser 29 notifying web browser 29 that the user access request sent to application 49 has been redirected to single sign-on program 38 (identified by the URL or program 38) so that web browser 29 will authenticate with single sign-on program 39 if not already registered or if already registered, should accept a session cookie from single sign-on program 38 for the session with web application 49 (step 224). In response to the redirect message, web browser 29 initiates an authentication request for single sign-on to program 38 on server 30 (step 228). If web browser 29 has a session cookie for user 15 for single sign-on program 38, then web browser 29 sends, with the authentication request, the session cookie for single sign-on program 38. In response to the authentication request from web browser 29 and session cookie, if any, from application 49 and the session cookie, if any, from web browser 29, single sign-on program 38 determines if single sign-on program 38 has a record in database 39 of authentication of user 15 for the session specified in the session cookie received from application 49 or web browser 29 (step 232).

If single sign-on program 38 has a record (in database 39) of a valid userID and password for user 15 (based on a previous registration of user 15 to single sign-on program 38) (decision 232, yes branch) single sign-on program 38 authenticates user 15 to application 49 by forwarding the userID and password (or other authentication credentials) for user 15 to application 49 (step 236). If application 49 determines that the userID and password are authentic for user 15, then application 49 generates a session cookie for a session with user 15, and returns the session cookie to single sign-on program 39 (step 240). This session cookie provided by application 49 identifies application 49 as a suffix to the domain in which application 49 resides. Application 49 also records the session identification included in the session cookie and the userID (for user 15) for which the session was established. The session cookie generated by the requested application 49 typically specifies by host name and URL a single application, i.e. the requested application 49, for which the session with user 15 is valid.

If single sign-on program 38 does not have a record (in database 39) of authentication of user 15 (i.e. there was no prior registration of user 15 with single sign-on program 38) (steps 232, no branch), single sign-on program 38 queries user 15 via web browser 29 for a password corresponding to the userID of user 15, and the user 15 supplies his or her password to the single sign-on program 38 in a registration process (step 234). (This query to the user for the user's password can be defined by an HTML sent by single sign-on program 38 to web browser 29.) In response to the registration information (including userID and password) supplied by user 15 to single sign-on program 38, single sign-on program 38 attempts to authenticate user 15 to application 49 (step 236). If the authentication is successful, then the requested application 49 generates a valid session cookie for application 49 (step 240). Application 49 also records the session identification included in the session cookie and the userID (or user 15) for which the session was established and sends the session cookie (without domain-scope) to the single sign-on program 38 (step 242). The session cookie generated by the requested application 49 typically specifies by host name and URL a single application, i.e. the requested application 49, for which the session with user 15 is valid.

In either case, in response to receipt of the session cookie from application 49, single sign-on program 38 modifies the scope of the session cookie received from application 49 so the scope is effective for all applications (including application 51) in the host server 40 for the requested application 49 as well as all applications in all other "related" host servers (step 244). For example, all host servers resident in the same Internet domain (or all host servers owned by the same company) may be considered "related". For example, application 49 has URL, "www-1.ABC.com/XYZ", application 69 has a URL "www-1.ABC.com/RST" and application 89 has a URL "www-2.ABC.com/MNO". Also by way of example, application 38 has a URL "www-1.ABC.com/GHK". Therefore, all programs 38, 49, 69 and 89 reside in the same Internet domain "ABC.com". In this example, single sign-on program 38 modifies the session cookie to be effective for all applications in the same Internet domain. In this example, where the requested application 49 has a URL "www-1.ABC.com/XYZ" (in which the "www-1.ABC.com" identifies the host server where "ABC" indicates the domain and "XYZ" identifies the application 49), single sign-on program 38 modifies the scope of the session cookie to be effective for all applications on all host servers in the same Internet domain "ABC.com". Consequently, single sign-on program 38 generates a session cookie for user 15 with session scope, "ABC" or "ABC.com", and this will be effective for all applications in the same Internet domain, ABC.com. Next, single sign-on program 38 returns the domain-scope (ABC.com) session cookie to web browser 29. Because single sign-on application 38 resides in the same domain "ABC.com" as applications 49, web browser 29 will accept from single sign-on program 38 such a session cookie to confirm a session with application 49. With this domain-scope session cookie, web browser 29 can access application 49 without user 15 having to authenticate himself or herself to application 49.

As explained above, in response to prior registration of user 15 with single sign-on program 38, single sign-on program 38 also generated another session ID and session cookie representing the session between user 15 and single sign-on program 38 (without domain-scope). Single sign-on program 38 also sent the corresponding session cookie (without domain-scope) to web browser 29 to be set in web browser 29. In response to subsequent generation of the domain-scope session cookie pursuant to the user's request to access web application 49 and the redirection from web application 49 to single sign-on program 38, single sign-on program 38 stores the session ID for the domain-scope session between user 15 and application 49 correlated to the session (without domain-scope) between user 15 and single sign-on program 38. Single sign-on program 38 also sends the corresponding domain-scope session cookie to web browser 29 (step 244), and directs web browser 29 to set this domain-scope session cookie at web browser 29 for the session with application 49. Web browser 29 retains the setting for the session cookie without domain-scope for the session with single sign-on program 38.

Next, the user 15 makes subsequent requests to application 49 to use application 49, and the web browser 29 provides the (domain-scope) session cookie with domain "ABC.com" for each such request (step 248). Upon receipt of each such use request including the session cookie with domain "www-1.ABC.com", application 49 will confirm that the (domain-scope) session cookie properly identifies the session between application 49 and the user 15. Consequently, application 49 will process these subsequent requests without redirecting these subsequent requests to the single sign-on program 38 and without requesting re-authentication from the user 15, because the domain-scope session cookie is valid for application 49, and application 49 has a record of the session ID (even though the session ID was not created for domain-scope). Pursuant to the processing of these requests, the requested application 49 may provide HTMLs or other responses to the client computer 20. If the requested application 49 provides additional HTMLs, then the user can use the HTMLs to make the subsequent requests and use application 49 with the domain-scope session cookie.

If user 15 subsequently attempts to access application 69, user 15 will send the session key with domain-scope of "ABC.com" to application 69 (along with the session key without domain scope for single sign-on program 38). The domain-scope session cookie recently furnished by single sign-on program 38 to web browser 29 pursuant to the prior access request to application 49 will not identify an active session of the user with the requested application 69 because application 69 has no record of this session. Consequently, the requested application 69 redirects the current user access request including the domain-scope session cookie (and the session cookie without domain-scope) to the single sign-on program 38 on server 30. Application 69 also sends a "redirect" message to web browser 29 notifying web browser 29 that the user access request sent to application 69 has been redirected to single sign-on program 38 (identified by the URL or program 38). In response to the redirect message, web browser 29 initiates an authentication request for single sign-on to program 38 on server 30. If web browser 29 has a session cookie for user 15 for single sign-on program 38 from a prior successful registration attempt, then web browser 29 sends with the authentication request the session cookie for single sign-on program 38. In response to the authentication request and session cookie, if any, from application 69 and the session cookie, if any, from web browser 29, single sign-on program 38 determines if single sign-on program 38 has a record in database 39 of authentication of user 15 for the session specified in either single sign-on session cookie which is received.

If single sign-on program 38 has a record (in database 39) of a valid userID and password for user 15 (based on a previous registration of user 15 to single sign-on program 38), single sign-on program 38 authenticates user 15 to application 69 by forwarding the userID and password (or other authentication credentials) for user 15 to application 69. In this example, single sign-on program 38 has a record of a valid userID and password for user 15 based on the prior registration of user 15 to single sign-on program 38. If application 69 determines that the userId and password are authentic for user 15, then application 69 generates a session cookie (without session scope) for a session with user 15, and returns the session cookie (without session-scope) to single sign-on program 38. Application 69 also records the session identification included in the session cookie and the userID (or user 15) for which the session was established. The session cookie generated by the requested application 69 typically specifies by host name and URL a single application, i.e. the requested application 49, for which the session with user 15 is valid. This session cookie provided by application 69 identifies application 69 as a suffix to the domain in which application 69 resides.

If single sign-on program 38 does not have a record (in record database 39) of authentication of user 15, single sign-on program 38 queries user 15 via web browser 29 for a password corresponding to the userID of user 15, and the user 15 supplies his or her password to the single sign-on program 38 in a registration process. (This query to the user for the user's password can be defined by an HTML sent by single sign-on program 38 to web browser 29.) In response to the registration information (including userID and password) supplied by user 15 to single sign-on program 38, single sign-on program 38 attempts to authenticate user 15 to application 69. If the authentication is successful, then the requested application 69 generates a valid session cookie (without session-scope) for application 69 and sends the session cookie to the single sign-on program 38. Application 69 also records the session identification included in the session cookie and the userID (or user 15) for which the session was established. The session cookie generated by the requested application 69 typically specifies by host name and URL a single application, i.e. the requested application 69, for which the session with user 15 is valid.

In either case, in response to receipt of the session cookie from application 69, single sign-on program 38 modifies the scope of the session cookie received from application 69 so the scope is effective for all applications in the host server 40 for the requested application 69 as well as all applications in all other "related" host servers. For example, all host servers resident in the same Internet domain (or all host servers owned by the same company) may be considered "related", as explained above. In the foregoing example, where the requested application 69 has a URL "www-1.ABC.com/RST" (in which the "www-1.ABC.com" identifies the host server where "ABC" indicates the domain and "RST" identifies the application 69), single sign-on program 38 modifies the scope of the session cookie to be effective for all applications on all host servers in the same Internet domain "ABC.com". Consequently, single sign-on program 38 generates a session cookie for user 15 with session scope, "ABC" or "ABC.com", and this will be effective for all applications in the same Internet domain, ABC.com. Next, single sign-on program 38 returns the domain-scope (ABC.com) session cookie to web browser 29. Because single sign-on application 38 resides in the same domain "ABC.com" as applications 69, web browser 29 will accept from single sign-on program 38 such a session cookie to confirm a session with application 69. With this domain-scope session cookie, web browser 29 can access application 69 without user 15 having to authenticate himself or herself to application 69.

If user 15 subsequently attempts to access application 89, then authentication proceeds as explained above for user 15's attempt to access application 69.

Thus, in accordance with the objects of the invention, the user can access multiple, related applications with a single user sign-on. The user need not authenticate himself or herself for access to the subsequently accessed, related applications. (The web browser 29 performs the authentication for each application 49, 69 and 89.) There is no proxy server interposed between the client computer 20 and each application server 40, 60 and 80 for all requests; the single sign-on server is only involved for initial authentication. The user need not even be aware that the subsequent access to the related applications require authentication. The user need not be aware of the single sign-on program 38, and web browser 29 need not be configured to request authentication from the single sign-on program 39. If user 15 does not request access to an application server, then that application server is not burdened with authentication information. Also, applications need only be reconfigured to redirect their un-authenticated requests to the single sign-on service instead of back to web browser 29.

Based on the foregoing, a system, method and program product for single sign-on according to the present invention have been disclosed. However, numerous modifications and substitutions can be made without deviating from the scope of the present invention. For example, if desired, single sign-on program 38 can reside in one of the web application servers 40, 60 or 80 instead of separate server 30. Therefore, the present invention has been disclosed by way of illustration and not limitation, and reference should be made to the following claims to determine the scope of the present invention.

The invention claimed is:

1. A method for authenticating a user at a first computer to first and second applications installed in a second computer, the method comprising the steps of:
a third computer receiving from the user a valid combination of userID and password;
the second computer receiving from the user of the first computer a request to access the first application, and in response, the second computer determining that the user has not yet been authenticated to the first application, and in response, the second computer redirecting the request to the third computer, and in response, the third computer determining that the user has been authenticated to the third computer based on the userID and password, and in response, the third computer notifying the second computer that the user is authentic, and in response, the second computer returning a session key to the third computer for a session between the first application and the user, the session key having a scope of the first application but not a scope of a domain; and
in response to the third computer receiving the session key from the second computer for the session between the user and the first application the third computer generating another session key with a scope of the domain, and the third computer sending the domain-scope session key to the first computer; and
subsequently, the second computer receiving from the user of the first computer another request with the domain-scope session key to the first application, and in response to the domain-scope session key received with the request, the second computer determining that the user is authentic and notifying the first application that the user is authentic so that the first application can respond to the first computer to the other request; and wherein
the domain is a group of two or more applications, including the first application and the second application, which are licensed to a same entity or have a same domain name URL component, and the scope of the session key with the scope of the first application does not include the second application such that the session key with scope of the first application does not directly grant access to the second application; and
subsequently, the second computer receiving from the user of the first computer another request with the domain-scope session key to the second application, and in response to the domain-scope session key received with the request, the second computer determining that the user is authentic and notifying the second application that the user is authentic so that the second application can respond to the first computer to the other request to the second application.

2. The method according to claim 1 wherein the step of the third computer receiving from the user a valid combination of userID and password occurs during registration of the user with the third computer.

3. The method according to claim 1 further comprising the subsequent steps of:
a fourth computer, having an application in the domain, receiving a request including the domain-scope session key from the user of the first computer to access the application in the fourth computer, and in response to the domain-scope session key, the fourth computer determining that the user is authentic and notifying the application in the fourth computer that the user is authentic so that the application in the fourth computer can respond to the first computer to the request to the application in the fourth computer.

4. A computer program product for authenticating a user at a first computer to first and second applications installed in a second computer, the computer program product comprising:
one or more computer-readable tangible storage devices and program instructions stored on at least one of the one or more storage devices, the program instructions comprising:
first program instructions for execution in the second computer to receive from the user of the first computer a request to access the first application, and in response, the first program instructions determine that the user has not yet been authenticated to the first application, and in response, the first program instructions redirect the request to a third computer;
second program instructions for execution in the third computer, to receive from the user a valid combination of userID and password, and responsive to the redirected request from the first program instructions, to determine that the user has been authenticated to the third computer based on the userID and password, and in response, the second program instructions notify the first program instructions that the user is authentic; and wherein
the first program instructions, responsive to the notification from the second program instructions, return a session key to the second program instructions for a session between the first application and the user, the session key having a scope of the first application but not a scope of a domain; and
the second program instructions, responsive to receipt of the session key from the first program instructions for the session between the user and the first application, generate another session key with a scope of the domain, and the second program instructions send the domain-scope session key to the first computer; and
the first program instructions, responsive to subsequent receipt from the user of the first computer of another request with the domain-scope session key to the first application, determine that the user is authentic and notify the first application that the user is authentic so that the first application can respond to the other request; and wherein
the domain is a group of two or more applications, including the first application and the second application, which are licensed to a same entity or have a same domain name URL component, and the scope of the session key with the scope of the first application does not include the second application such that the session key with the scope of the first application does not directly grant access to the second application; and
the first program instructions, responsive to subsequent receipt from the user of the first computer of another request with the domain-scope session key to the second application, determine that the user is authentic and notify the second application that the user is authentic so that the second application can respond to the first computer to the other request to the second application.

5. The computer program product according to claim 4 wherein the second program instructions receive from the user the valid combination of userID and password during a registration of the user with the third computer.

6. The computer program product according to claim 4 further comprising:
third program instructions, stored on at least one of the one or more storage devices, for execution in a fourth computer having an application in the domain, to receive a request including the domain-scope session key from the user of the first computer to access the application in the fourth computer, and in response to the domain-scope session key, the third program instructions determine that the user is authentic and notify the application in the fourth computer that the user is authentic so that the application in the fourth computer can respond to the first computer to the request to the application in the fourth computer.

* * * * *